United States Patent [19]

McCoy et al.

[11] 3,839,176

[45] Oct. 1, 1974

[54] METHOD AND APPARATUS FOR REMOVING CONTAMINANTS FROM LIQUIDS

[75] Inventors: Lowell R. McCoy, Woodland Hills; Lawrence L. Prem, Tarzana, both of Calif.

[73] Assignee: North American Rockwell Corporation, El Segundo, Calif.

[22] Filed: Sept. 25, 1972

[21] Appl. No.: 293,303

Related U.S. Application Data

[63] Continuation-in-part of Ser. No. 273,590, July 20, 1972, abandoned, which is a continuation-in-part of Ser. Nos. 121,903, March 8, 1971, abandoned, and Ser. No. 121,904, March 8, 1971, abandoned, said Ser. No. 121,903, is a continuation-in-part of Ser. No. 852,703, Aug. 25, 1969, abandoned, and Ser. No. , , said Ser. No. 121,904, is a continuation-in-part of Ser. No. 852,705, Aug. 25, 1969, abandoned.

[52] U.S. Cl. ............................... 204/191, 204/302
[51] Int. Cl. ........................... B03c 5/00, B03c 5/02
[58] Field of Search ......................... 204/186–191, 204/302

[56] References Cited
UNITED STATES PATENTS

| | | | |
|---|---|---|---|
| 1,838,921 | 12/1931 | Fisher | 204/190 |
| 2,116,509 | 5/1938 | Cottrell | 204/188 |
| 2,364,118 | 12/1944 | Wolfe | 204/188 |
| 3,324,026 | 6/1967 | Waterman et al. | 204/302 |
| 3,398,082 | 8/1968 | Lochmann et al. | 204/302 |
| 3,567,619 | 3/1971 | Brown | 204/188 |

*Primary Examiner*—T. M. Tufariello
*Attorney, Agent, or Firm*—L. Lee Humphries; H. Kolin

[57] ABSTRACT

An electrical apparatus and method utilizes an alternating or periodically interrupted unidirectional electric field applied between opposing electrodes to a stream flowing therebetween comprised primarily of a liquid having a low dielectric constant and containing finely emulsified contaminants having a higher dielectric constant to separate the contaminants from the stream as a coalesced impurity. At least one electrode is electrically insulated from the stream. One of the opposing electrodes has a fuzzy hydrophilic coating for enhancing the contaminant separation.

Passage of the liquid stream through the electric field applied to the electrodes causes the finely emulsified phase to be coalesced into much larger droplets. This treatment is particularly effective where water is emulsified in hydrocarbon liquids. For certain applications, prior to treatment additional quantities of water are added to the water initially present in the hydrocarbon liquid. The total amount of water is then coalesced. The coalesced water may be removed by any suitable means such as by gravity separation or by use of a filter. Pairs of electrodes are suitably connected in series or in parallel arrangements to provide a multiple-stage electrical system.

15 Claims, 17 Drawing Figures

INVENTORS
LAWRENCE L. PREM
LOWELL R. McCOY

BY

H. FREDRICK HAMANN
ATTORNEY

INVENTORS.
LAWRENCE L. PREM
LOWELL R. McCOY

FIG. 17

METHOD AND APPARATUS FOR REMOVING CONTAMINANTS FROM LIQUIDS

CROSS-REFERENCES TO RELATED APPLICATIONS

This application is a continuation-in-part of application Ser. No. 273,590 filed July 20, 1972 now abandoned, which is a continuation-in-part of the combined applications of L. R. McCoy, Ser. No. 121,903, and of L. R. McCoy and L. L. Prem, Ser. No. 121,904, both filed Mar. 8, 1971 and both now abandoned. Application Ser. No. 121,903 is a continuation-in-part of application Ser. No. 852,703, and application Ser. No. 121,904 is a continuation-in-part of application Ser. No. 852,705, both applications filed Aug. 25, 1969, and since abandoned.

Copending application Ser. No. 121,902, filed Mar. 8, 1971 and now U.S. Pat. No. 3,770,605, entitled "Apparatus and Method for Removing Solids from Liquids," by L. R. McCoy, is commonly assigned with the present application.

The invention herein described was made in the course of or under a contract or subcontract thereunder with the U.S. Department of the Army.

BACKGROUND OF THE INVENTION

This invention relates to an electrical apparatus and process for removing dispersed contaminants from streams of fluids which are themselves substantially nonconductive to the passage of electric current. It more particularly relates to removing emulsified water, initially present or deliberately added, from hydrocarbon fuels, lubricating oils, paints, vegetable oils, organic cleaning agents such as chlorinated hydrocarbons and other organic fluids having a low dielectric constant.

It is frequently necessary to remove liquid contaminants such as water or aqueous solutions of salts from fuels or other fluids if these fluids are to be suitable for their intended use. As an example, emulsified water droplets in aircraft fuels may freeze, forming ice crystals which will plug fuel lines interrupting the flow of fuel to the engine. Gross quantities of dispersed water carried in the fuel stream may cause engine failure or malfunction. Where the entrained water contains dissolved salts, corrosion of fuel system components may also result. Various means have been employed to remove such liquid contaminants. Mechanical filters described as filter/separators have been and are being used for this purpose for various fuels in internal combustion engines. However, these suffer loss of effectiveness if surface-active materials are present in the fuels.

Alternatively, the passage of such contaminated fluids through an electric field has been employed as a means of causing coalescence of dispersed aqueous contaminants, thereby facilitating their removal from the fluid stream by gravity separation or other mechanical means. The beneficial effects of such electric fields have been variously described as resulting from induced dipole coalescence, electrophoresis, and dielectrophoresis.

In the case of electrophoresis, dispersed contaminant particles bearing a charge are attracted to an oppositely charged electrode and are then removed from the stream. (See Auderbert and deMende, *The Principles of Electrophoresis*, London, Hutchinson, 1959.) In the other instances, the beneficial effect of electric fields is attributable largely to forces arising from dipole orientation in the field. (See Waterman, *Chem. Eng. Progr.*, 61, 51 (1965).) The effectiveness of the electric fields in such cases is therefore dependent upon a substantial difference in the dielectric constants of the dispersed matter and of the host fluid to be clarified. Many organic fluids such as hydrocarbon fuels have relatively low dielectric constants while water, a common contaminant, has a relatively high dielectric constant.

A number of electrical devices are known in the prior art which utilize one or more of the above-discussed effects. All of the electric field effects described above have been indicated to be mechanisms for coalescence of liquid contaminants and removal of dispersed solid matter although varying degrees of emphasis are placed on the specific mechanism. Electrophoresis is specifically cited as a major contributor to the removal of particulate contaminants in U.S. Pat. Nos. 3,205,160; 3,205,161; 3,252,884; and 2,849,395, and is inferred by others. Ionization by discharge from pointed electrodes is described in U.S. Pat. Nos. 3,074,870; 3,129,157; and 3,247,091, the ionization resulting in attraction of the resulting charged particles to an electrode having an opposite charge; while U.S. Pat. No. 3,314,872 describes the establishment of an emulsion-breaking field by generation of a static charge created by forcing the fluid through a porous plug.

The use of electric fields generated by voltages of alternating polarity and applied between non-insulated electrodes is described in U.S. Pat. No. 2,849,395, in which frequencies in the range of 25 to 1,000,000 cps are shown as effective in breaking emulsions. In British Pat. Nos. 419,292; 1,050,074; and 1,084,355, various types of porous packing materials are shown as present in the spacing between the electrodes. The devices shown in the foregoing patents utilize non-insulated electrodes which are generally widely spaced apart to avoid electrical shorting. The use of such electrodes in close-spacing is limited to conditions where a low content of an electrically conductive contaminant, usually water, is present in the fluid stream being treated. In U.S. Pat. No. 1,838,921, both electrodes are non-insulated and in the form of circular, horizontal shelves, with non-opposing portions of both electrodes being covered with a material having an affinity for water over oil, such as plaster of paris. Such an arrangement is undesirable in that the electrodes in such a structure must similarly be widely spaced apart to avoid electrical shorting where other than small amounts of water are present in the oil.

In U.S. Pat. Nos. 1,838,924 and 1,838,925, a film of oil having a relatively low water content is used as a dielectric barrier between the emulsion being treated and one of the electrodes to prevent shorting. Such a system is complicated in its requirements for additional fluid connections and auxiliary apparatus, or is unduly bulky where only convective circulation is used. Also, in U.S. Pat. No. 1,838,925 a coating that is hygroscopic is suggested for use on the central electrode. In British Pat. No. 481,121 electrical shorting in the device is avoided by utilizing a plurality of cylindrical insulated electrodes to treat water-in-crude oil emulsions. An electrical apparatus for desalting crude oil by the addition of water and its subsequent removal is shown in U.S. Pat. Nos. 3,129,157 and 3,148,133.

The foregoing devices have been found lacking in various respects which militate against their full commercial utilization. Where the electrodes are non-insulated, the devices are subject to malfunction by electrical shorting if a significant amount of a conductive impurity such as water is present. Such shorting occurs whether or not direct or alternating voltages are applied to the non-insulated electrodes. Similarly, where a porous packing material is present between the electrodes, any large amounts of water accumulating in the reservoir-type packing material will increase the likelihood of shorting between electrodes. Where the fluid is flammable, a hazard of explosion may also exist in these cases. The device shown in British Pat. No. 481,121, which avoids electrical shorting, however uses a large number of insulated, fragile, cylindrical electrodes disposed across and along the fluid stream. Such an arrangement is highly inefficient in subjecting the fluid to wide fluctuations in electric field intensity ranging from inadequate to excessive for treatment purposes. This inefficiency in the use of electric fields results in a device that is excessively large and heavy.

The foregoing devices thus do not provide suitable means of treating flammable fluids containing large percentages of water in a safe, reliable, and efficient manner. The present invention defines improvements over these prior art methods and arrangements.

SUMMARY OF THE INVENTION

The present invention provides a method for separating an emulsified liquid phase of high dielectric constant from liquids having a low dielectric constant. It is particularly directed to an emulsion-treating apparatus and method for utilizing an alternating or periodically interrupted unidirectional electric field to achieve coalescence and deentrainment of emulsified immiscible liquid contaminants from substantially nonconductive liquids such as petroleum fuels, organic cleaning fluids, solvents, gasoline, oils, paints, liquid fats, and other such liquids.

According to the invention, there is provided emulsion-treating apparatus and a method for decreasing the concentration of dispersed contaminant in a substantially nonconductive liquid, the apparatus comprising first and second electrodes having spaced, facing surfaces substantially parallel to each other and defining therebetween a channel for the flow of the liquid, means for applying an alternating or periodically interrupted unidirectional electric field between the first and second electrodes and across the channel, and means for enhancing the separation of the contaminant from the liquid in the channel through the action of the electric field, the last-named means including a layer of a solid insulating material isolating at least one electrode from the liquid stream and further including a fuzzy hydrophilic substance positioned on one of the electrodes so that coalescence of the contaminant is promoted.

In a further aspect of the present invention, for certain applications amounts of emulsifiable liquid are added to the fluid stream to promote and increase coalescence of the emulsified liquid contaminant. Such addition is utilized where only a small quantity, e.g., 5 to 1,000 ppm, of the emulsified liquid contaminant is present in the fuel stream and it is desired to enhance bubble formation and thereby increase collision frequency, thereby resulting in more efficient deemulsification. After addition of contaminant, the concentration of this contaminant prior to removal will generally be about 5,000 to 20,000 ppm.

Additional amounts of emulsifiable liquid may be added essentially for purposes of washing the fuel to remove salts present in the fuel. Thus by addition of water to a typical hydrocarbon fuel containing dissolved salts, an emulsion of water and fuel is formed. The water is then coalesced and removed in accordance with the present invention, the dissolved salts being present in the water and removed therewith.

Many of the dissolved salts present in the original fuel have a corrosive effect on turbine blades or parts of internal combustion engines and must be removed for this reason. However, it is also feasible to utilize this technique of addition of emulsifiable liquid where it is desired to recover valuable salts present in a fuel. These valuable salts will be recovered from the coalesced liquid contaminant.

The addition of amounts of emulsifiable liquids to the fuel stream is also utilized to remove biological organisms and growths such as fungi, slimes, and microorganisms. Such growths generally occur at an oil-water interface, and frequently result in the plugging of fuel lines and interfere with the running of machinery. The added water is coalesced with the water originally present, and the removed water contains the undesired organisms and growths.

In a further aspect of the present invention, the removal of suspended, particulate matter associated with the liquid contaminant is effected by the action of the electric field on the emulsified liquid contaminant. Where desired, amounts of emulsifiable liquid can be added to the fluid stream to enhance removal of the solid matter along with the subsequently coalesced liquid contaminant.

In another aspect of the invention, the electrodes are staged in series or in parallel for the purpose of improving performance and fluid-flow capacity.

The present invention is particularly applicable to the treatment of hydrocarbon fuels by an electrical device where the possibility of an explosive mixture of air and fuel may result from the accidental entrance of air into the device during periods of inactivity and where an electric discharge between electrodes would therefore create an exceptionally hazardous condition. The prior art shows devices having electrodes spaced a sufficient distance apart to minimize the hazard of electrical shorting between charged electrodes. While such devices are useful for the continuous treatment of crude oils, they are not well suited to the treatment of more refined and flammable products such as gasoline for the reason cited above. Also, for certain purposes, e.g., treatment of refined products or cleaning fluids, the flow rate of the fluid to be treated is small, as compared to that common to the treatment of crude oil. In such instances, it is desirable that the treating device be as small and compact as possible, making the expedient of widely spaced electrodes undesirable. Since the voltage gradient is an important factor in the effectiveness of the treating device, much higher voltages are required where the electrodes are widely spaced. Further, the passage of substantial quantities of current through the fluid will, if the contaminating liquid is water or an aqueous solution, result in electrolysis generating a potentially explosive mixture of hydrogen and/or oxygen gas, creating an explosive hazard even where the main constituent of the stream to be treated is substantially non-explosive. The present invention avoids the hazards of explosion or excessive power consumption through interelectrode arcing by electrically isolating one or both of the opposing electrodes from the stream to be treated.

It has been found in the present invention that where one or both electrodes are insulated, only alternating and periodically interrupted unidirectional electric field can be used effectively. Thus the application of an alternating field having a frequency of from about 5 to 1,000 cycles per second, suitably and preferably a 60-cycle A.C. field, has been found to produce coalescence of finely dispersed water in hydrocarbon fuels. Similar beneficial effects are also obtained using electric fields generated by periodically interrupting a direct current to produce square waves or other periodic waveforms, preferably at frequencies of 10 to 60 per second. Thus many types of electric fields reported useful with non-insulated electrodes, such as direct-current fields and high-frequency fields in the kilocycle and megacycle ranges, are essentially ineffective for use with the present invention.

It is considered an essential feature of the present invention that, in addition to at least one electrode being insulated, one of the opposing electrodes have positioned thereon a fuzzy hydrophilic coating or covering. Preferably this fuzzy hydrophilic covering is applied to at least a portion of only one of the electrodes. Where only one electrode is insulated, this fuzzy hydrophilic coating is preferably applied to the non-insulated electrode. The surface of the electrode not covered by the fuzzy coating, whether or not insulated, is preferably smooth and resistant to fouling by fluid contaminants.

The effectiveness of removal by coalescence of the emulsified contaminant is markedly enhanced where one electrode has a relatively smooth surface and where only one electrode has positioned thereon a fuzzy hydrophilic coating. Thus a particularly preferred embodiment for one pair of electrodes providing enhanced coalescence of the emulsified contaminant utilizes a non-insulated metal electrode on which is positioned a fuzzy hydrophilic coating consisting of a layer of felt, such as a wool-rayon felt. This felt-covered non-insulated electrode is preferably at ground potential. The opposing insulated electrode is preferably the high-voltage electrode. This insulated electrode preferably utilizes for its smooth outer coating a thin layer of a smooth polymeric material, particularly polytetrafluoroethylene, commercially available as Teflon. The outer container in which both electrodes are located is generally a metallic container. This is then suitably grounded as a safety feature.

The spaced, facing surfaces of the opposing electrodes, which define the channel for the flow of liquid, are substantially parallel to each other. Thereby the applied electric field is of substantially constant intensity over the full length of the treatment zone. Such a field can be readily controlled and maintained to optimize the coalescence treatment. Parallel-plate electrodes are suitably utilized to provide the desired flow channel. When a more compact arrangement of electrodes is desired, the opposing electrodes are preferably disposed in the form of concentric cylinders. Slanted or cone-shaped electrodes providing a parallel wall flow channel of uniform field intensity may also be used.

Pairs of the opposing electrodes may be staged in series of parallel arrangement to improve performance and increase fluid-flow capacity. Where series staging is used, for certain applications it is advantageous to utilize fields of different intensities for the successive stages.

DESCRIPTION OF PREFERRED EMBODIMENTS

In its broadest aspects, the present invention is directed to the removal of a dispersed contaminant having a high dielectric constant from a liquid having a low dielectric constant. The low dielectric constant liquid is itself substantially nonconductive when free from contaminant. However, because of the commercial importance of having a convenient, rapid, and effective method of economic interest for the removal of water from industrial fuels, the present invention will be particularly described with reference to such removal.

Figure 1:
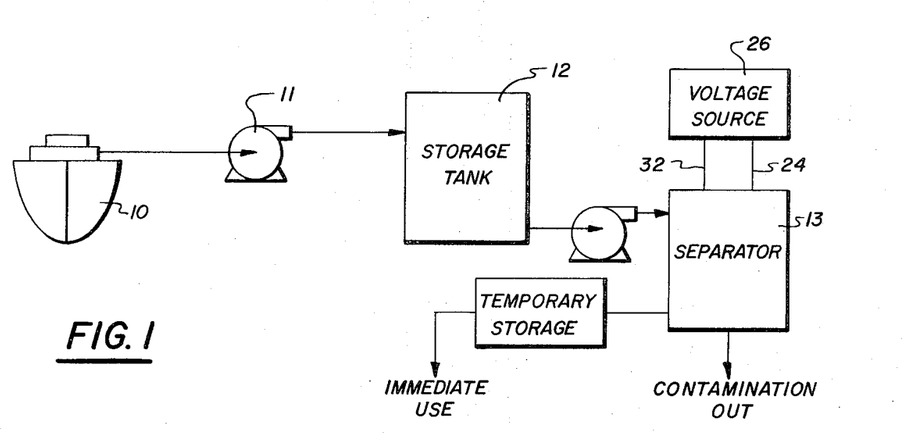
FIG. 1 is a schematic diagram of a system in which the method and apparatus of the present invention are used.

Referring to FIG. 1 of the drawings, the present invention is shown adapted for use in a fuel storage system in which fuel transported by a ship, barge, or other bulk shipping device 10 is emptied through a pump 11 to a storage tank 12. During the transportation and long storage periods, condensed water or sea water becomes mixed with the fuel and represents a potentially dangerous contaminant, particularly where that fuel is aircraft fuel. Since the presence of water in such fuel can result in engine failure, the removal of such a contaminant prior to use and in reasonable proximity to where it will be used as a fuel significantly increases safety in aircraft use. Thus, a contaminant-removing separator 13 is introduced into the system thereby providing a means for removing immiscible contaminants such as water from aircraft fuel. While the presence of water in other fuels represents less of a hazard to life, this contaminant may result in engine malfunction and an economic loss.

Figure 2:
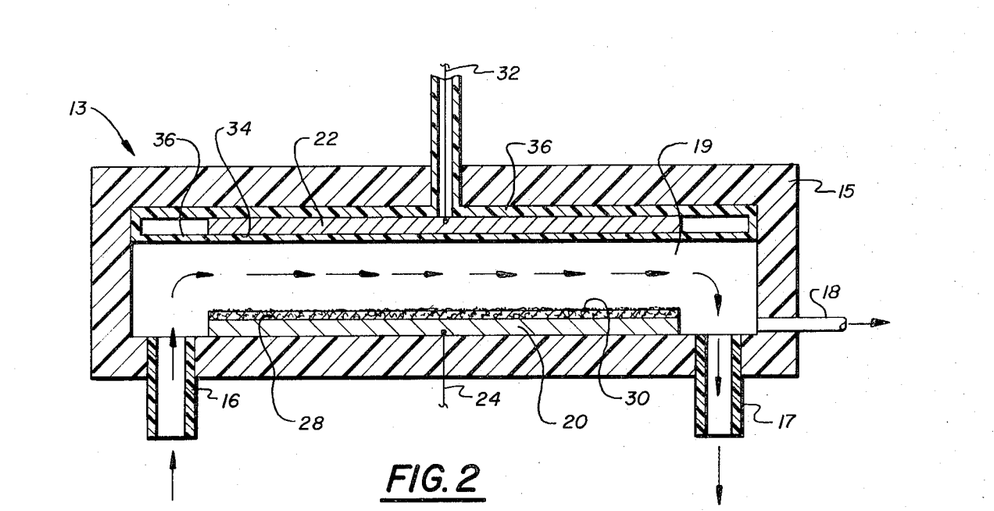
FIG. 2 is a sectional plan view of the apparatus showing the flow path of a liquid being treated in accordance with the present invention.

Referring to FIG. 2, the separator 13 comprises a closed electrically insulated container 15 provided with an inlet 16 for the low dielectric liquid to be treated, an outlet 17 for the treated liquid, and a drain 18 for removal of the contaminant (e.g., water) separted by the electric field effect imposed on a liquid flow channel 19. Adjacent the sides of channel 19 are two plate-type electrodes 20 and 22. While one preferred embodiment, illustrated in FIG. 2, utilizes plate-type electrodes, it is within the purview of the present invention to utilize a more compact concentric electrode relationship, illustrated in FIG. 10, or other types well known in the art including multi-plate designs described hereinafter with reference to FIG. 8. Electrode 20 in FIG. 2 is connected through a ground lead 24 to the grounded side of a voltage source 26 (see FIG. 1) and has its working surface 28 aligned so as to define a substantial portion of one side of channel 19.

Working surface 28 of electrode 20 has a coating or layer 30 of a hydrophilic and fibrous or fuzzy material at least partially covering the working surface. For the purposes of the present invention, the term "hydrophilic" is broadly used to refer to those materials which are preferentially wetted by the contaminant to be removed rather than by the low dielectric constant fluid stream that is being purified. In order that the function of this fuzzy hydrophilic coating or covering be more clearly understood, the basic electric field effect will be described in more detail. Electrically induced turbulence is imparted to the water droplets in the fuel stream by the action of the field. The violent motion of these droplets materially assists in coalescence of the finely dispersed water. It has been found that the presence of the fuzzy hydrophilic coating or covering 30 results in the enhancement of such agitation.

One characteristic of the coatings found to produce this beneficial effect is that they be preferentially wetted by the contaminant, e.g., water (hydrophilic), rather than by the fuel. Such coating materials include cotton, glass cloth, and felt, particularly a felt consisting of equal parts of wool and viscose rayon fibers. Conversely, Teflon felt, known to be hydrophobic, did not assist in de-emulsification in this manner nor did fibrous metal electrodes. Aside from the wetting properties of these coatings, further benefit results from the physical surface characteristics of the coating. Thus hydrophilic fibrous, fuzzy coatings such as wool-viscose felt provide improved performance over that observed with coatings having relatively smooth surfaces (cotton, glass cloth). The points or projections provided by the rougher surface of the mass of fluffy particles or fibers appear to provide small regions of intense electric fields increasing turbulence in such regions. A combination of both hydrophilic and fuzzy or fibrous properties is thus particularly preferred and effective as an electrode covering, particularly in a system designed to remove water from hydrocarbons. The fuzzy hydrophilic coating 30 positioned on electrode 20 is permeable to the fluid stream and thus does not serve to insulate electrode 20 from the fluid stream present in channel 19.

Again referring to FIG. 2, there is disposed in opposing relationship to electrode 20 on which coating 30 is positioned, a high voltage electrode 22 connected through a lead 32 to the high-voltage side of voltage source 26 (see FIG. 1). This voltage supply provides an alternating or periodically interrupted unidirectional electric field in the region of channel 19 defined by electrodes 20 and 22. The applied alternating field has a frequency of from about 5 to 1,000 cycles per second. A 60-cycle field is conveniently obtained and preferred. Where a periodically interrupted unidirectional field is applied, such a field is preferably generated by periodically interrupting a direct current to produce square waves, preferably at frequencies of 10 to 60 per second. An effective voltage range is from about 5 to 50 kv rms.

The working surface 34 of electrode 22 may be bare metal (provided electrode 20 is insulated) or may be coated or covered by an adherent layer of an electrically insulating material 36. Preferably electrode 20 is non-insulated and electrode 22 is insulated, being enclosed in an envelope of insulating material 36 as shown in FIG. 2. Suitable insulating materials for coating electrode 22 are Buna N rubber, epoxy resins, and fluoridized polymers. It is preferred that the insulated surface be smooth and hydrophobic and resistant to fouling by fluid contaminants. A thin layer of polytetrafluoroethylene (Teflon) is particularly effective and preferred as an external surface layer (not shown) for insulating material 36. The insulating material 36 is aligned on the working surface 34 of electrode 22 so as to define a substantial portion of the adjacent side of the liquid flow channel 19. Channel 19 may vary in width depending upon the type of fluids being separated, the flow rate and the voltage applied across the electrodes. Normally, however, the channel will vary from about ⅛ inch to about 1 inch. Larger electrode spacings which allow greater throughput are preferred in those instances where such spacings do not require application of excessively high voltages.

In general, the operation of the device shown in FIG. 2 is as follows: the liquid to be treated is pumped through inlet 16, down channel 19, and through outlet 17. During its travel down channel 19, which may have any desired length, the application of an alternating or periodically interrupted unidirectional electric field of suitable intensity between electrodes 20 and 22 causes the dispersed liquid droplets of contaminant (water) to coalesce and accumulate so that a liquid rich in contaminant material can be removed through drain 18. In this manner, after one or more stages of application of the electric field effect by the arrangement of FIG. 2, the treated liquid has a substantially reduced concentration of contaminant.

Figure 3:
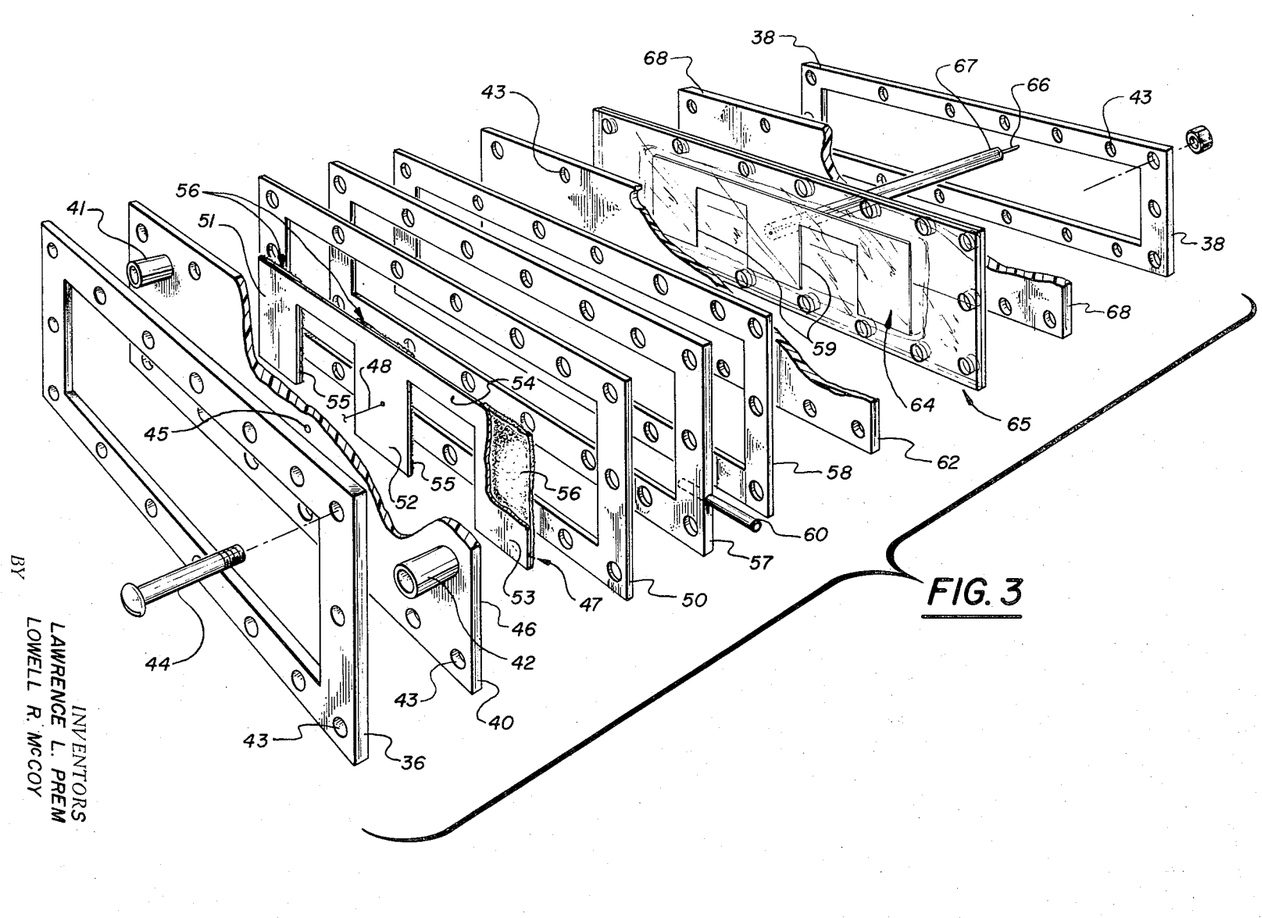
FIG. 3 is an exploded view of an embodiment of the present invention.

A detailed structural arrangement showing a suitable embodiment of the present invention is shown in the exploded view of FIG. 3. The device shown comprises front and back frame members 37 and 38, respectively, between which are clamped the various components defining an operative cell arrangement. Located between these two frame members 37 and 38 is a front plate 40 having a liquid inlet 41 and a liquid outlet 42 located on opposite ends of its longitudinal dimension. Front plate 40, as well as the other plate members to be aligned therewith, contains a plurality of apertures 43 around its periphery and through which a plurality of bolts 44 are inserted for holding the various components between the two frame members in aligned, sealed relationship. Also provided in front plate 40 is an aperture 45 through which an electrical lead may be passed in sealed relationship as described in detail hereinafter. Adjacent to an inner surfaces 46 of front plate 40 is an electrically conductive electrode structure 47 preferably fabricated from a stainless steel foil to which an electrical lead 48 is connected at a location adapted to pass through aperture 45 in front plate 40. Appropriate sealing means around lead 48 such as an epoxy resin may be utilized to insure that a liquid seal is maintained in aperture 45. The electrode structure 47 may be a solid sheet of electrically conducting material having a dimension slightly less than the aperture formed by a rubber insulating gasket 50. However, the preferred structure for electrode 47 is that shown in FIG. 3 and comprises two or more extending electrode portions 51, 52 and 53 which are integral with a top-connecting portion 54 and develop separate stages in the operative cell. Specifically, an electrode structure having a 3 inch height, a 7½ inch length, an electrode width and spacing of 1½ inches each, and a ¼ inch top connecting portion 54, has resulted in the operative characteristics shown in FIG. 5, as described in detail hereinafter. While such a top-connecting portion is a preferred arrangement, it is within the purview of the present invention to use a plurality of physically separated extending electrode portions, such as 51, 52, and 53, which are interconnected by electrical leads in place of the connecting portion 54. The primary consideration in the staged electrode structure is to provide a plurality of edges 55 along channel 19 (see FIG. 2) to enhance the effect of electric fields utilized to separate the aqueous substances in the liquid flowing through the channel 19, as is explained hereinafter.

The surface of electrode 47 in FIG. 2 which is adjacent and exposed to channel 19, or at least portions of electrodes 51, 52, and 53, is at least partially covered with a fuzzy hydrophilic covering 56 which further enhances the electric field effect within channel 19. Electrode 47 is connected to the ground side of voltage source 26, and is not insulated, its only covering being the fuzzy hydrophilic material 56, which is permeable to the fluid stream.

Adjacent to gasket 50 is a channel-forming frame member 57 which abuts gasket 50 on one side and a similar gasket 58 on its other side. Frame member 57 generally defines channel 19 through which the liquid to be treated will flow and therefore defines a cavity which communicates directly with inlet 41 and outlet 42. Frame member 57 was ¼ inch thick in the example referred to above. It is clear that the structure of electrode 47 must be smaller than the aperture formed by frame member 57 so as not to impede the flow of the liquid to be treated along channel 19. This arrangement is more clearly shown in the view of FIG. 2. Channel-forming frame member 57 contains an outlet aperture and pipe 60 through which the accumulated contaminant-enriched liquid may be drained from the lower portion of channel 19.

A solid insulating electrode cover 62, preferably fabricated of Plexiglas or Teflon, having a plurality of appropriate apertures 43 along its edge portion, is positioned in abutting relation to gasket 58. Insulating cover 62 is sufficiently thick so as to electrically isolate the two electrodes from each other at the voltage level employed. The insulating cover 62 electrically insulates a high-voltage electrode 64 from the liquid in channel 19 formed by the frame member 57, thereby eliminating any possiblity of an electric discharge between the electrodes. Electrode 64 is preferably of the same geometry as electrode 47, i.e., a plurality of edges 59 are formed along the longitudinal channel direction to enhance the edge effect as is explained in more detail hereinafter. However, such edge-forming geometry is not essential to the operability of the present invention. Electrode 64 is preferably formed of a stainless steel foil although other electrically conducting materials may be utilized. As an added precaution in the event of any leaks, electrode 64 may be further isolated from the liquid being treated by enclosing it in a thin vinyl plastic sheeting 65 which is heat-sealed around the electrode.

Electrically connected to electrode 64 is a high voltage lead 66 enclosed in an insulating tube 67 integral with the plastic sheeting 65. The high voltage lead 66 is connected to the high voltage side of voltage source 26 (see FIG. 1). A solid backing plate 68, preferably made of an electrically insulating material, supports electrode 64 in a plane that is preferably parallel with the plane formed by electrode 47.

Adjacent to backing plate 63 is back frame member 38 which cooperates with front frame member 37 and a plurality of bolts 44 to seal the various elements, including front plate 40, gasket 50, channel-forming frame member 57, gasket 58, insulating cover 62, vinyl plastic sheeting 65, and backing plate 63 into a sealed cell assembly. As shown in FIG. 3, each of these members has an appropriate series of apertures 43 through which the bolts 44 are inserted.

Figure 4:
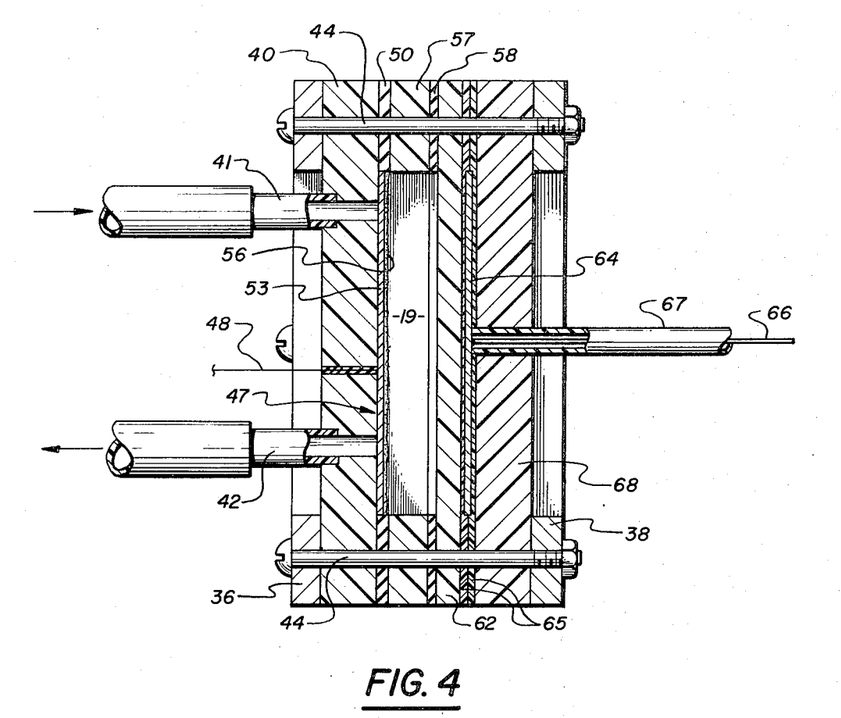
FIG. 4 is a sectional end view of the embodiment of FIG. 3 in assembled relationship.

The cell of FIG. 3 is shown as an assembled and sealed unit in cross section in FIG. 4 where like numbers represent corresponding parts in FIG. 3. As may be seen from the cross-sectional view of FIG. 4, the high-voltage electrode 64 is completely electrically insulated not only from the opposing electrode 47, but also from the liquid material in channel 19. Further, it is also apparent that the fuzzy hydrophilic material 56 is present on electrode 47 which is directly exposed to the liquid within channel 19. Thus the possible inclusion in the stream being treated of air bubbles which could result in an explosive mixture between the electrodes or the generation of an explosive mixture of hydrogen and oxygen gases where the contaminating liquid is water, and the attendant hazards are eliminated by the structural arrangement of the present invention.

Figure 5:
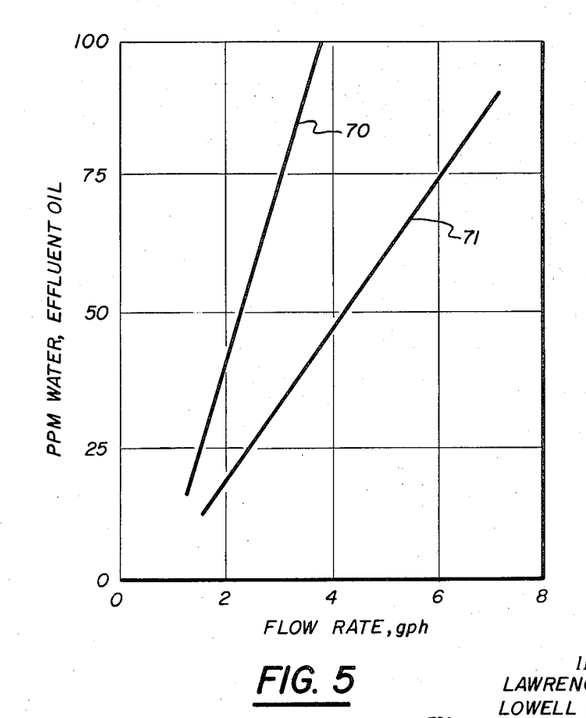
FIG. 5 is a graph showing the relative performance in an apparatus having an electrode covered with a fuzzy hydrophilic coating compared with an apparatus in which the corresponding electrode lacked such a covering.

FIG. 5 shows the improvement in operation resulting from the combination of an electrically isolated electrode and a non-insulated electrode covered with a fuzzy hydrophilic coating. The graph of FIG. 5 shows the parts per million of water in an effluent oil, after passing through a cell of the type shown in FIGS. 3 and 4, as a function of the flow rate. For the particular comparison made, 2,000 ppm of distilled water was initially added to a volume of No. 2 diesel fuel and passed through the device of the present invention at different flow rates. In the case represented by curve 70, the device was operating with one electrode 64 isolated from channel 19 by insulating cover 62. The other electrode 53 was completely bare, i.e., it had no hydrophilic or fibrous coating or cover. By contrast, the reduction in the concentration of the liquid (water) in the major liquid phase (diesel fuel) is apparent from curve 72 which shows the results obtained by covering the surface of electrode 53 with a fuzzy hydrophilic material 56. The fibrous hydrophilic coating in this case was a 1/16 inch—thick layer of 50 percent wool and 50 percent viscose rayon cemented to the electrode portions 51, 52, and 53. In both cases a 13 kv (peak-to-peak) 60-cycle voltage was applied between the electrodes 53 and 64. The electrodes were planar and formed a ⅛ inch-wide channel 19.

It was determined by running the same experiment, except without the application of power, that only the combination of applied power and the fibrous hydrophilic coating provided the improved result.

It is apparent from FIG. 5 that it was only at low flow rates, e.g., 1 gal/hr., that the addition of the fuzzy hydrophilic coating to the electrode offered but limited benefit. At higher flow rates for both cases, a substantial reduction in contaminant concentration is achieved merely by providing a fibrous hydrophilic coating or covering over at least a portion of one of the electrodes. Thus the present invention provides a method and apparatus for substantially reducing the residence time during which the liquid to be treated must be exposed to the electric field.

Moreover, it appears that providing a plurality of edges formed by electrode portions 51, 52, and 53 enhances the coalescence of the contaminating water because of the effect of the edges of the electrode portions. However, the effect of the fuzzy hydrophilic coating is independent of this edge effect although it cooperates with the edges to provide an overall improvement in the removal of water from oil.

Figures 6, 7, 8, 9, 10, 11:
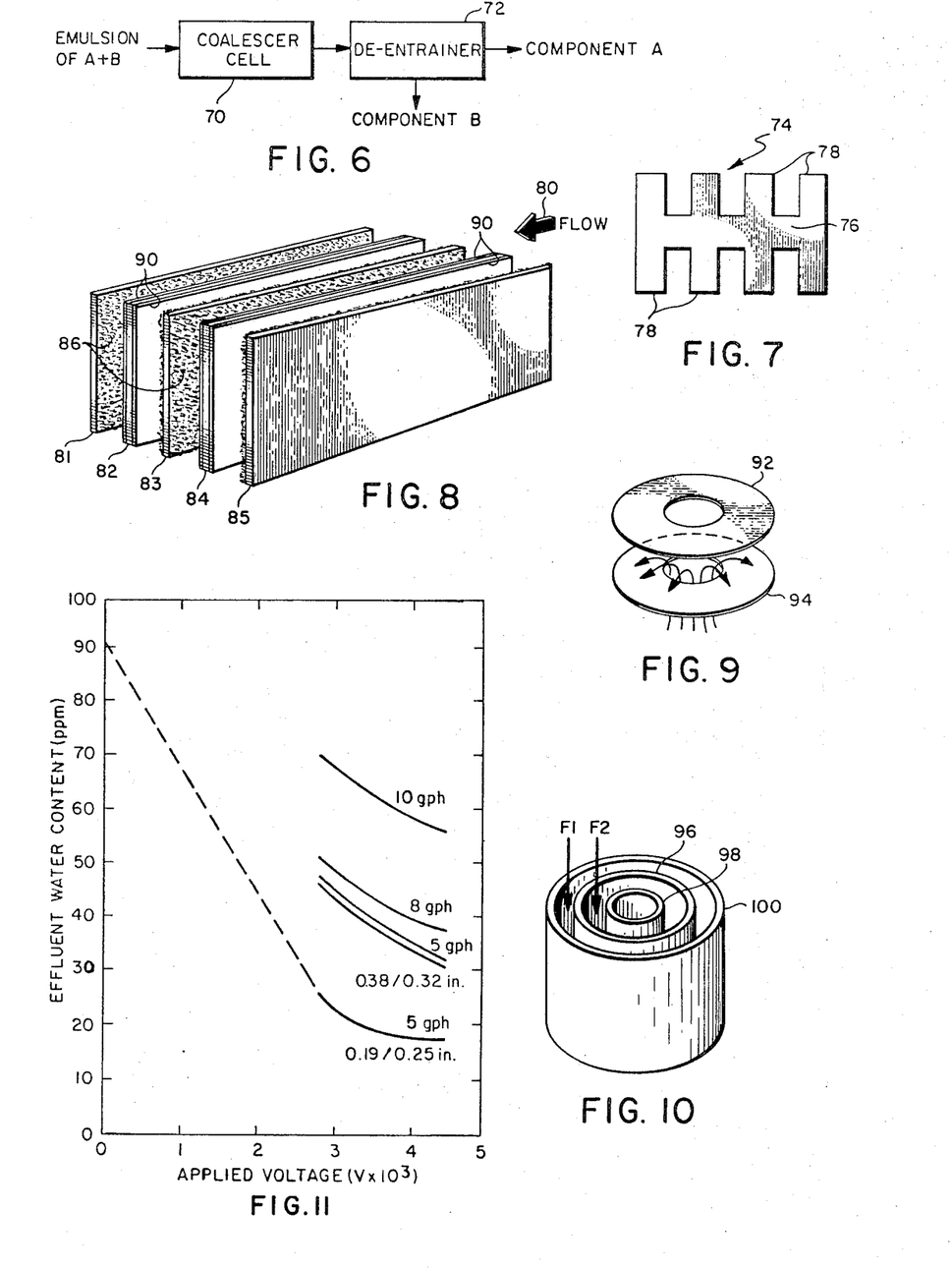
FIG. 6 is a schematic diagram illustrating the combination of coalescence and de-entrainment of an emulsion.
FIG. 7 is an elevational view illustrating a preferred electrode shape.
FIG. 8 is an elevational view illustrating the use of parallel electrode stages.
FIG. 9 is an elevational view illustrating an electrode arrangement having parallel plates and radial flow.
FIG. 10 is an elevational view illustrating an electrode arrangement having concentric cylinders for the flow paths.
FIG. 11 is a graph illustrating effluent quality as a function of applied voltage.

An arrangement as shown in FIG. 6 is also contemplated. There, a cell 70 serves to coalesce the liquid component having a high dielectric constant, and a de-entrainer or separator 72 is employed to effect the removal of coalesced liquid. Cell 70 may be of a plate, multi-plate or concentric design as noted above. Separator or de-entrainer 72 may consist of a hold-up chamber where the denser component settles out by gravity, or it may consist of a filter separator having the ability to separate the coalesced fraction from the remainder of the stream. Although selection of the filter material will depend upon the fluids undergoing treatment, a wide variety of filter materials or membranes will operate effectively.

FIG. 7 illustrates a preferred embodiment of a multi-edged or staged electrode. An electrode 74 consists of a central portion 76 and a plurality of finger-like portions 78. It will be apparent to those skilled in the art that other shapes yielding multi-edge electrodes may be used. Staging may also be accomplished by the serial alignment of a plurality of cells. If desired, a portion of the contaminant, for example, water, which is coalesced in any of the serially aligned cells may be separated by conventional de-entrainment before the fluid undergoing treatment is supplied to the next cell. A series of cells with intermediate de-entrainment can be used to separate a three-component emulsion into its separate components. An example of such a three-member emulsion is oil, water, and Freon.

Increased capacity for fluid treatment is easily achieved in the present invention by providing a plurality of parallel stages. One such arrangement is schematically illustrated in FIG. 8. A flow stream 80 of a liquid contains particulate contaminants. Flow stream 80 is directed between parallel electrodes 81, 82, 83, 84, and 85. Electrodes 81, 83, and 85 are connected to ground and have a fibrous hydrophilic coating 86 adjacent the flow stream. Electrodes 82 and 84 are charged and are covered with an insulating material 90. By constructing a cell in multistage parallel fashion, each charged electrode operates to provide a voltage gradient to two flow channels. Thus fewer electrodes are required than if a plurality of two electrode cells are combined.

FIG. 9 illustrates an electrode arrangement having parallel plates and radial flow. Electrodes 92 and 94 represent the working electrodes, one of which has a surface coated with a fuzzy hydrophilic coating and the other of which is insulated. Fluid to be treated flows between the electrodes as indicated by the arrows shown after entering via the center opening of one of the electrodes. An electrode design as shown in FIG. 9 furnishes a constant voltage gradient and a decreasing velocity of fluid flow, the latter due to an increase in flow area with increasing diameter. In some instances a decreasing flow velocity aids in the settling out of coalesced contaminants. In addition, it is foreseen that where the contaminant has a greater density than the fluid being purified, circular cells of this type might be rotated thereby imparting a centrifuge-type action on coalesced particles thereby aiding in contaminant removal. If desired, fluid flow may be in the reverse so that an increasing velocity regime is presented.

FIG. 10 illustrates another alternative cell design. Such a configuration of concentric electrodes is particularly preferred where a compact cell design is required. Electrode 96 is a high-voltage insulated electrode and is concentrically disposed between electrodes 98 and 100. These latter electrodes are preferably non-insulated and have a fuzzy hydrophllic coating on the surfaces facing insulated electrode 96. The fluid being treated is downwardly flowed through channels F1 and F2 defined by the electrode arrangement. While two flow channels have been shown, additional parallel flow channels may be obtained by providing additional concentric electrodes of successively increasing diameter. Generally, the three-electrode configuration shown in FIG. 10 is preferred since two flow channels are obtained using only one insulated electrode, this electrode being the more costly component of the device.

Figure 17:
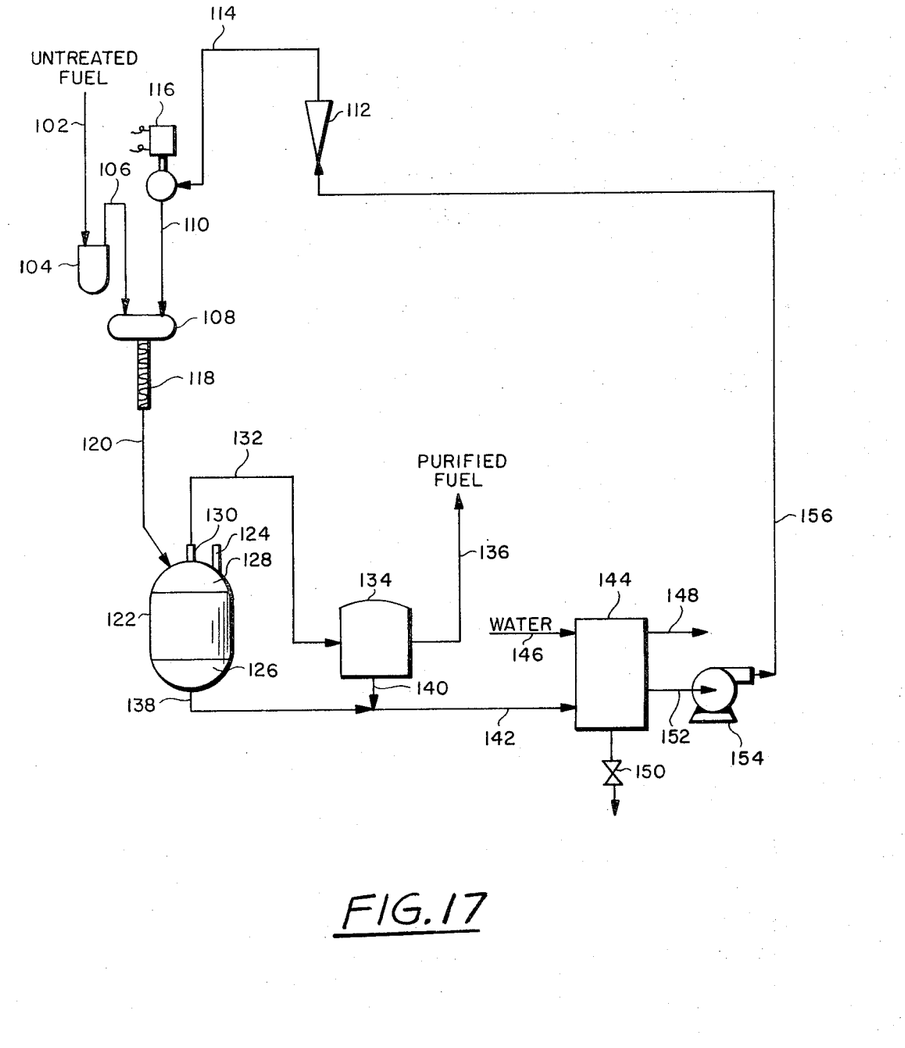
FIG. 17 is a schematic diagram of a system in which the method and apparatus of the present invention are used in conjunction with the prior addition of water to the fuel.

FIG. 17 illustrates the utilization of the method and apparatus of the present invention as part of a fuel purification system in which water is added to the fuel prior to electrocoalescence. In a typical operation, untreated fuel from a storage tank (not shown) is passed by way of a conduit 102 into a strainer 104 and removed therefrom by way of a conduit 106 and passed into a mixing chamber 108. Water is initially added to mixing chamber 108 by way of a conduit 110, which is also utilized for adding makeup water to the system where required. The flow of water into the mixing chamber 108 is monitored by means of a flow meter 112, and then the water is fed by way of a conduit 114 through a solenoid valve 116. Solenoid valve 116 is actuated only when the system is being operated to process fuel. When injection of water into the fuel is not desired, the solenoid valve is switched to the off position.

While several means of mixing water with fuel are available and can be used, a commercially available static mixer 118 consisting of a number of stainless steel spiral elements housed within a short length of stainless pipe is preferred. Using such a unit at a flow rate of 30 gallons per minute (gpm), a fine dispersion is readily achieved using a 12-element mixer and a ½-in. diameter pipe about 2.5 ft. in length. By controlling the flow rate of the water, water injection rates generally between 0.1 and 2 percent by weight of the fuel are readily maintained. The water-treated, "washed," or emulsified fuel leaves the mixer 118 by way of a conduit 120 and enters an electrocoalescer unit 122.

A suitable electrocoalescer unit 122 capable of a 30 gpm flow contains six fuel flow channels approximately 7-in. long provided by a set of electrodes arranged concentrically. Proper distribution of fuel is provided by use of a perforated fuel distribution plate having a distribution of properly sized holes selected to provide a uniform fuel flow velocity in all annular spaces between the concentric electrodes. The electrode pairs are energized by a high-voltage transformer, typically a 0.1 kva, 60-cycle transformer with a maximum output of 11 kv (rms). A vent safety switch 124 is provided to insure that the electrocoalescer vessel is adequately vented before the circuit can be energized.

The treated fuel leaves through a small de-entraining chamber 128 and exits from the coalescer unit by way of a top port 130. From there it is passed by way of a conduit 132 to a filter unit 134. A suitable 30 gpm filter unit has a diameter of about 12-in., is 34-in. high, and uses four disposable cartridges operating in parallel. The purified fuel is recovered from the filter by way of a conduit 136. Where desired, continuous recording turbidity meters (not shown) may be inserted in conduit 136 to monitor the quality of the fuel leaving the filter.

The water coalesced by the applied electric field in electrocoalescer unit 122 is collected in a sump region 126 at the bottom of this unit. This water, which may also include dissolved or dispersed solids, leaves coalescer unit 122 by way of a conduit 138. Water is also removed from filter unit 134 by way of a conduit 140. The water streams from the coalescer and the filter are fed by way of a conduit 142 to a settling tank 144. The settling tank is suitably sized to store water for the desired number of hours of continuous operation. For example, for a 30 gpm oil-throughput and 2 percent water injection, a tank capacity of about 40 gallons will provide adequate storage volume for several hours. Makeup water or initial water is conveniently added to the system by way of a conduit 146 feeding into settling tank 144. For certain applications, filter unit 134, which serves essentially as a "polishing" filter, may be dispensed with.

Residue rising to the top of the settling tank 144 can be decanted for disposal by way of a conduit 148. Other residue settling to the bottom of tank 144 is removed by way of a valved conduit 150 for disposal, or for recovery where valuable recoverable materials are present in the residue. Water for recirculation in the process leaves settling tank 144 by way of a conduit 152, and is fed by means of a pump 154 and a conduit 156 to solenoid valve 116 and then to the fuel washing chamber 108. The makeup water used is a relatively small amount of that present in the system. Depending upon the impurities found in the fuel, the makeup water may be in the range of 1 to 15 gph for a 30 gpm system.

PROCESS

The present invention presents a novel and efficient process for separating emulsions of immiscible liquids having differing dielectric constants. This method thus allows the separation of a dispersed liquid contaminant of high dielectric constant from a liquid of low dielectric constant. In its preferred aspects, the substantially nonconductive liquid stream to be treated is caused to flow between a first high-voltage insulated electrode and a second grounded and non-insulated electrode on which is positioned a fuzzy hydrophilic coating. These opposed electrodes define the liquid flow channel. Effective separation of contaminants from the liquid stream is obtained by applying an alternating or periodically interrupted unidirectional field of suitable intensity between the first and second electrodes and across the channel. For the coalescence of water in a hydrocarbon fuel-water emulsion, the frequency of the alternating or periodically interrupted unidirectional electric field may vary from about 5 to about 1,000 cycles per second. A particularly preferred and effective range for either type of electric field is from about 10 to about 60 cycles per second. The lower portion of this range appears to give the most effective coalescence, whereas very good coalescence can be achieved using standard 50- or 60-cycle alternating current. At these frequencies, coalescence of water is achieved over a wide range of voltages. However, for each application and each fluid treated there will generally be an optimum voltage and frequency taking into account cell design and flow rate. For coalescence of water in diesel fuel flowing at 1 gal/min in a flat plate-type cell and a channel thickness of about ⅝-in., the most effective voltage range is from about 11 to 14 kv rms (about 30 to 40 kv, peak-to-peak). Under the same channel conditions, water is most effectively coalesced from JP-5 fuel at a voltage range of from about 8 kv to about 16 kv rms. In general, electrode spacing may vary from about ¼-in. to 1-in. and is not by itself a crucial factor. However, varying the distance between electrodes will alter the voltage gradient and power requirements. Generally, more voltage and power are required for larger spacings. Larger electrode spacings do, however, allow for treatment of a greater amount of fluid in a single cell.

The flow rate of the fluid through the cell is not a critical factor but will normally have a certain maximum value due to cell design. For any given emulsion, the flow rate which yields an optimum or most effective residence time is readily determined. In the coalescence of water from fuel-water emulsions, residence times of from about 1 to 5 seconds are very effective.

The process is not strongly temperature dependent and has not been found to be pressure dependent.

A preferred arrangement for the removal of water from fuels is thus a process comprising the steps of: coalescing the emulsified water content by passage through an electric cell of the type described hereinabove, separating the coalesced water from the bulk fuel stream by gravity or by filtration, and removing the water from the system. Using this combination of process steps, the water content of fuels having an original content of from 10 percent or more can be reduced to a few parts per million.

The process of the present invention is illustrated by the following non-limiting examples.

EXAMPLE 1

An emulsion of 1 wt. percent water in kerosene was passed through a cell having bare electrodes. The electrodes were separated by a distance of about 3/16 inch. A constant 2 kv D.C. voltage was applied. The initial temperature was 22°C and the flow rate was about 2 gal/hr. Under these conditions, coalescence appeared only momentarily, then shorting of the cell occurred with attendant electrolytic action and charring of the plastic cell body.

EXAMPLE 2

An emulsion containing 1 wt. percent water in kerosene was passed through a plastic tubular cell. The inner surface of the cell was in contact with a spiral coil of uninsulated copper wire, which served as one electrode. The other electrode was a central rod, ¼ inches in diameter, insulated with Teflon tubing. At a flow rate of about ½ gal/hr and a temperature of 22°C, some coalescence of the water was observed upon the application of 3 kv D.C.

EXAMPLE 3

A 1 wt. percent emulsion of water in diesel fuel was treated as in Example 2. No coalescence was achieved under these conditions. At 13.5 kv D.C. some coalescence was achieved, but only where the central electrode was positive.

EXAMPLE 4

A 0.2 percent (2,000 ppm) emulsion of water in diesel fuel was passed through a cell of a design as shown in FIG. 3, with the high voltage electrode insulated. The non-insulated electrode had a covering of 50 percent wool-50 percent viscose rayon felt. The electrode gap was about 3/16 inch and flow was maintained at about 10 gal/hr. At a temperature of 22°C and a voltage of 5–10 kv rms, superior coalescence of water was observed at 60 cycles per second alternating current. Gravity settling of the water occurred within the cell.

EXAMPLE 5

A 0.2 percent (2,000 ppm) emulsion of water in diesel fuel was passed through the cell used in Example 4 under the same conditions with the exception that direct current was used. No coalescence was observed even at voltages up to 16 kv.

EXAMPLE 6

A 2,000 ppm emulsion of water in diesel fuel was passed through a cell as used in Example 4 at different flow rates. The distance between the electrodes was 0.25 inch; an alternating current of 60 cycles per second was used. The high voltage electrode was insulated, and a wool-viscose felt covered the non-insulated electrode. The applied rms voltage values and flow rates were varied. The results are shown in FIG. 11.

EXAMPLE 7

Figure 12:
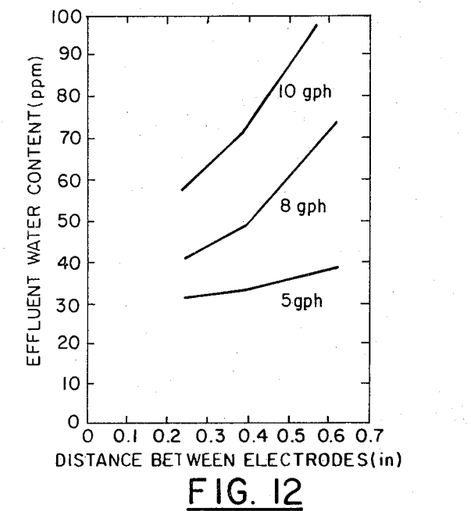
FIG. 12 is a graph illustrating effluent quality as a function of electrode spacing.

A 2,000 ppm emulsion of water in diesel fuel was treated as in Example 6 except that the voltage was held constant and the electrode spacing was varied. The results for 5, 8 and 10 gal/hr flows are shown in FIG. 12.

EXAMPLE 8

Figure 13:
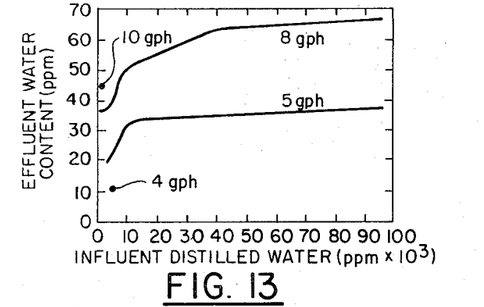
FIG. 13 is a graph illustrating effluent quality as a function of original water content.

A 2,000 ppm emulsion of water in diesel fuel was treated as in Example 7, except at a constant electrode spacing. The water content was varied, and data were obtained for passage through the cell of fuels having various water contents at 5 and 8 gal/hr flow. The results are shown in FIG. 13.

EXAMPLE 9

Figure 14:
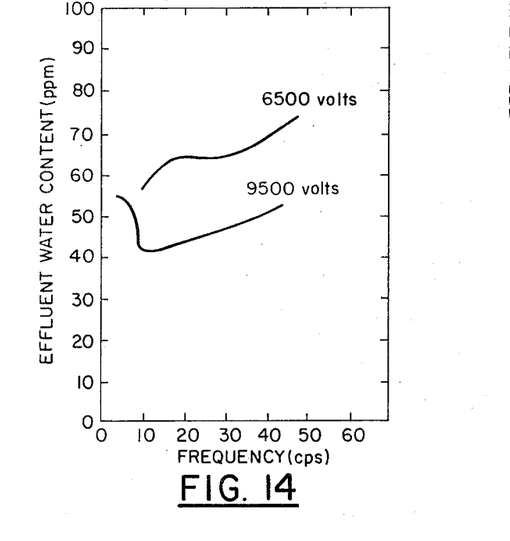
FIG. 14 is a graph illustrating effluent quality as a function of frequency for an emulsion of water-in-diesel fuel.

A 2,000 ppm emulsion of water in diesel fuel was treated as in Example 8. The flow rate was held constant at 10 gal/hr, and the frequency was varied between 5 and 50 cycles per second (square waves), at voltages of 6.5 and 9.5 kv. The results are shown in FIG. 14.

EXAMPLE 10

Figure 15:
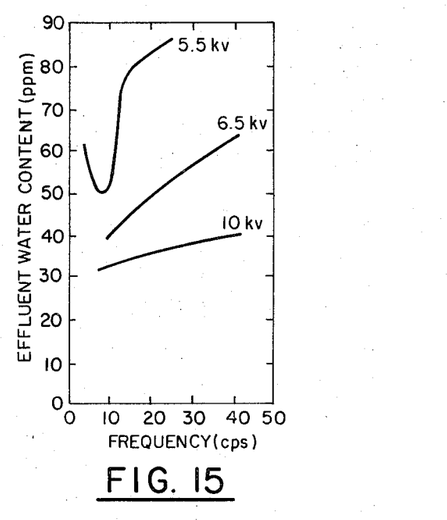
FIG. 15 is a graph illustrating effluent quality as a function of frequency for an emulsion of water-in-JP-5 jet fuel.

A 2,000 ppm emulsion of water in JP-5 fuel was treated as in Example 4 at 5.5, 6.5 and 10 kv rms and at various frequencies between five and 50 cycles per second (square waves). The results are shown in FIG. 15.

EXAMPLE 11

Figure 16:
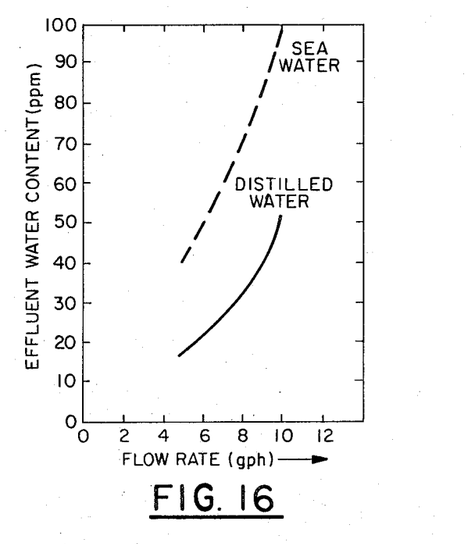
FIG. 16 is a graph illustrating effluent quality as a function of flow rate for distilled water and sea water emulsions.

A 2,000 ppm emulsion of sea water in diesel fuel was treated as in Example 10 at 60 cycles per second alternating current and 4.5 kv rms and at various flow rates. The results are shown in FIG. 16.

EXAMPLE 12

Emulsions of water in diesel oil ranging from 1 to 5 vol. percent water were treated in a cell using 6-in-long concentric electrodes similar to the cell shown in FIG. 10. The insulated electrode 96 consisted of a cylindrical perforated aluminum core about 5-¼ inches in diameter and 20 mils thick. The aluminum core was completely encased in a glass-fiber-reinforced epoxy resin insulation of about 50 mils thickness. A smooth outer layer of Teflon about 5 mils thick was disposed on the epoxy resin surface. The central electrode 98 and outer electrode 100 were non-insulated electrodes of stainless steel and spaced concentrically from the insulated electrodes. A 1/16 inch layer of 50 percent wool-50 percent viscose rayon was adherently bonded to those surfaces of the non-insulated electrodes 98 and 100 facing the insulated electrode surfaces. Fluid-flow channels F1 and F2 were about ⅝ inch in width.

A 60-cycle alternating voltage ranging from about 6 to 11 kv rms was applied to the electrodes, the insulated electrode 96 being the high-voltage electrode. The emulsion was flowed downward through both flow channels at a combined rate of about 5 gal/min. At an applied voltage of 7 kv, optimal removal of water occurred for all concentrations.

EXAMPLE 13

Diesel oil containing 3 vol. percent emulsified water and 0.143 gm red iron oxide per gallon of fuel oil was treated in a cell containing concentric electrodes similar to the cell described in Example 12. The red iron oxide was dispersed as a slurry in a small quantity of the diesel fuel before being added to the main stream of the diesel fuel to give the above concentration.

A 60-cycle alternating voltage at about 8 kv rms was applied to the electrodes. The contaminated fuel was flowed downward at a combined rate of about 5 gal/min, with the result that the emulsified water was coalesced and largely deposited on the bottom of the treating vessel. It was apparent by visual observation that much of the red iron oxide contaminant was being trapped by the de-emulsified or coalesced water. When the coalesced water was drained from the treating vessel, much of the red iron oxide was also removed in this process.

Similar experiments performed with other types of electrode systems but using the same concentrations of red iron oxide and water contaminants in diesel fuel indicated that approximately 60 percent of the solid matter injected was being removed with the de-emulsified water.

EXAMPLE 14

A turbid-appearing contaminated sample of an as-received diesel fuel oil was analyzed for its total water content (combined and free water) using Karl Fischer reagent. Five samples of the untreated fuel showed a water content ranging from 744 to 1,088 ppm for an average value of 860 ppm. Also, 100-gram samples of the as-received fuel oil were ashed and analyzed spectrographically for elemental constitutents. An ash content of about 3 ppm was obtained. A fuel purification system similar to that shown in FIG. 17 was utilized. However, in a first run the unpurified fuel sample was treated directly in the coalescer, without any prior addition of water or subsequent down-stream filtration. The coalescer was energized by applying 8.5 kvac, rms, to the electrodes. Karl Fischer analyses of two samples of the treated oil showed an average value of 650 ppm total water following the treatment.

In a second run, 2 vol. percent tap water was injected at the pump inlet and emulsified with the fuel. The emulsified fuel was then treated in the coalescer by applying about 7.0 kvac, rms, to the electrodes. The so-treated fuel was visibly cleaner in appearance, although it was observed that small droplets of coalesced water were being carried along with the fuel stream. The treated fuel oil was then passed through a de-entraining means, in the form of a packed-bed fibrous "polishing" filter. Karl Fischer analyses of two samples showed an average remaining water content of 160 ppm. Thus the initial water content of the as-received fuel had been reduced from 860 ppm to 160 ppm, after being increased to 20,000 ppm by addition of 2 vol. percent water. Also the 160 ppm water present in the effluent represents essentially chemically combined or dissolved water, which can only be removed by appropriate chemical means or by a re-distillation process. Thus almost all of the free water initially present in the as-received sample had been removed. The ash content analysis of the final effluent showed an ash residue of less than 1 ppm (reduced from 3 ppm). Also, spectrographic analysis for the individual elements initially present in the ash showed that these elements had been reduced to below quantitative measurement levels. Visual comparison of the as-received sample with the finally processed sample also showed a striking improvement in clarity of the final sample.

EXAMPLE 15

A bacteriologically infested sample of JP-5 jet fuel was emulsified by adding 2 vol. percent water to the fuel and circulating the oil-water mixture through a centrifugal pump. The emulsified oil-water sample was then treated in the coalescer and filtered as described in Example 14. Coalesced water was removed from the apparatus and used as a bacteriological culture medium. This culture continued to grow at a rapid rate over a period of 4 months.

In order to provide a controlled test, two additional samples were prepared from the as-received bacteriologically infested JP-5 fuel oil. One sample consisted only of purified JP-5 fuel oil, water having been removed by treatment in the coalescer as above described. Wool viscose felt was inserted in the sample in order to provide a site for bacteriological growth. No culture growth was evident with this sample consisting of only the purified oil. A second sample was prepared by adding to the purified oil some water removed from the washing of a bacteriologically infested as-received fuel. Again wool viscose felt was used as a site for bacteriological growth. In this latter sample, a considerable culture of bacteria grew on the felt situated at the water-oil interface.

While the invention has been described in terms of preferred embodiments and specific illustrative examples, it will be obvious to those skilled in the art that various modifications and adaptations of the invention are possible without departure from the spirit and scope of the invention. For example, whereas the preferred embodiments of the invention relate to the separation of water from hydrocarbon fuels, it is clear that other emulsified contaminants having a high dielectric constant can be separated from other liquids having a low dielectric constant. It is also apparent that the device and method of the present invention may be employed in cooperation with other conventional separatory devices or methods. Accordingly, this invention is not to be limited by the illustrative and specific embodiments thereof, but its scope should be determined in accordance with the claims thereof.

We claim:

1. Emulsion-treating apparatus for decreasing the concentration of a dispersed contaminant in a substantially nonconductive liquid comprising:
   a. first and second electrodes having spaced, facing surfaces substantially parallel to each other and defining therebetween a channel for the flow of the liquid,
   b. a layer of a solid electrically insulating material positioned on a facing surface of at least one of said electrodes isolating it from the nonconductive liquid,
   c. a layer of a fuzzy hydrophilic substance positioned on a facing surface of only one of the electrodes, and d. means for applying an alternating or periodically interrupted unidirectional electric field having a predetermined frequency from about five to about 1,000 cycles per second between said first and second electrodes and across the channel so that upon application of said field, coalescence of the dispersed contaminant is promoted so as to enhance the separation of the contaminant from the nonconductive liquid in the channel.

2. The emulsion treating apparatus of claim 1 in which the first electrode is insulated and the fuzzy hydrophilic substance is positioned on at least a selected portion of only the second electrode.

3. The emulsion treating apparatus of claim 1 in which the electrode carrying the fuzzy hydrophilic substance has an exposed surface to the liquid formed with a succession of edges.

4. The emulsion treating apparatus of claim 1 in which said predetermined frequency is about 60 cycles per second.

5. The emulsion treating apparatus of claim 1 including additional substantially parallel electrode pairs cooperating with said first and second electrodes to define additional flow channels.

6. The emulsion treating apparatus of claim 1 in which said first and second electrodes are plate electrodes positioned in a substantially parallel relationship.

7. The emulsion treating apparatus of claim 1 wherein said electrodes are circular plates, at least one of said electrodes having an annular opening therein whereby liquid undergoing treatment may be passed through said opening and between said plates.

8. The emulsion treating apparatus of claim 1 wherein said first and second electrodes are concentric cylinders.

9. The emulsion treating apparatus of claim 8 wherein said first electrode is an insulated electrode concentrically disposed between a pair of noninsulated second electrodes whose surfaces facing the insulated electrode have positioned thereon a fuzzy hydrophilic substance.

10. A method of decreasing the concentration of a dispersed immiscible liquid contaminant in a substantially nonconductive liquid stream flowing in a channel defined by facing surfaces of a pair of electrodes, the first electrode having a layer of a solid electrically insulating material positioned on a facing surface thereof and isolating said electrode from the stream, the second electrode having a layer of a fuzzy hydrophilic substance positioned on a facing surface thereof, comprising:

subjecting the liquid stream flowing in said channel to an alternating or periodically interrupted unidirectional electric field having a predetermined frequency from about five to about 1,000 cycles per second to promote coalescence of the dispersed contaminant, and then removing said coalesced contaminant from said liquid stream.

11. The method of claim 10 wherein amounts of an emulsifiable liquid contaminant are added to said liquid stream prior to effecting coalescence of dispersed liquid contaminant present.

12. The method of claim 11 wherein the initial amount of dispersed liquid contaminant is between about 5 and 1,000 ppm, and after further addition of liquid contaminant between about 5,000 and 20,000 ppm of liquid contaminant based on said liquid stream is present prior to effecting said coalescence.

13. The method of claim 10 wherein said liquid stream contains both liquid and solid contaminants, the solid contaminant being removed along with said liquid contaminant.

14. The method of claim 10 wherein said liquid stream contains a solid contaminant, and a liquid contaminant is added to said stream to facilitate removal of said solid contaminant along with removal of said liquid contaminant.

15. The method of claim 10 wherein said dispersed immiscible liquid contaminant is selected from the group consisting of water and sea water and wherein said liquid stream is a liquid hydrocarbon.

* * * * *